No. 855,517. PATENTED JUNE 4, 1907.
D. LIPPY & A. NICODEMUS.
VALVE.
APPLICATION FILED MAY 16, 1906.

Witnesses
Jos. J. Hosler.
Sylvia Boron.

Inventors
David Lippy
Abraham Nicodemus.
By H. W. Bond
Attorney

UNITED STATES PATENT OFFICE.

DAVID LIPPY AND ABRAHAM NICODEMUS, OF MANSFIELD, OHIO, ASSIGNORS OF ONE-THIRD TO ALBERT K. SHAUCK, OF MANSFIELD, OHIO.

VALVE.

No. 855,517.         Specification of Letters Patent.         Patented June 4, 1907.

Application filed May 16, 1906. Serial No. 317,079.

*To all whom it may concern:*

Be it known that we, DAVID LIPPY and ABRAHAM NICODEMUS, citizens of the United States, residing at Mansfield, in the county of Richland and State of Ohio, have jointly invented certain new and useful Improvements in Valves; and we do hereby declare that the following is a full, clear, and exact description of the same, reference being had to the annexed drawings, making a part of this specification, and to the numerals and figures of reference marked thereon, in which—

Figure 1:
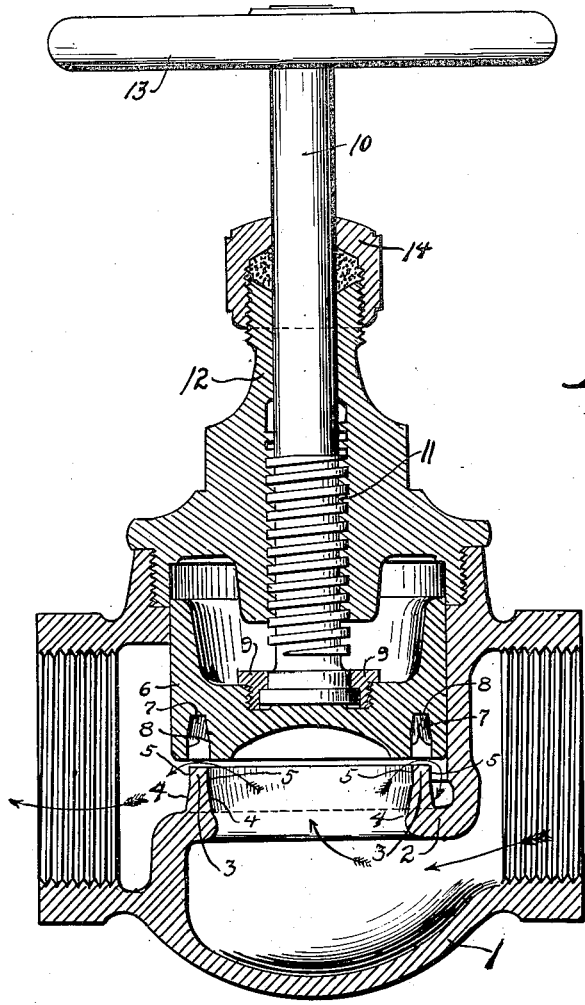
Figure 2:
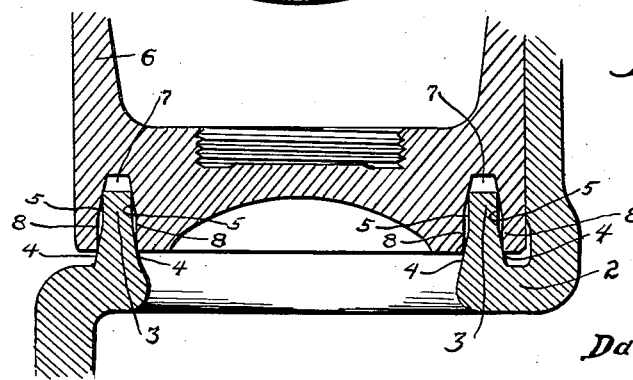

Figure 1 is a vertical section showing the valve partially open. Fig. 2 is an enlarged vertical section showing a portion of the valve and its seat.

The present invention has relation to valves designed for water or steam or for any purpose for which valves of this kind can be used, as the invention has more special reference to the valve seat or cut off and its nature consists in the different parts and combination of parts hereinafter described and particularly pointed out in the claims.

Similar numerals of reference indicate corresponding parts in all the figures of the drawing.

In the accompanying drawing, 1 represents the valve body, which may be of any desired form. The valve-body is provided with the integral valve seat or flange web 2, which is located in the valve body substantially as shown in the drawing. Upon the flange seat web is located the annular flange or valve seat proper 3, which is tapered upon its inner and outer peripheries from its base upward to within a short distance of its top or in other words the flange seat is provided with tapered faces 4 and parallel faces 5, the parallel faces being located upon the upper portion of the valve seat flange proper, said valve seat flange being formed as just above described for the purpose hereinafter specified. The valve 6 is provided upon its under side with the annular groove 7, which annular groove is tapered at its top portion and its lower portion provided with straight or parallel faces or walls 8. By providing the valve seat flange with the tapered faces and the parallel faces, an angle will be formed upon the valve seat flange, which angle is adapted for contact with the walls of the groove.

The groove 7 and the seat flange are formed as above described for the purpose of providing metal contact at two different horizontal planes, or in other words the lower or tapered portion of the annular seat flange is brought into contact with the parallel walls of the annular groove and the portion of the annular seat flange provided with the parallel faces is brought into metal contact with the tapered portion of the annular groove formed in the valve, by which arrangement two distinct and narrow contact lines are produced. By providing the double taper there are two contact points for the tapered portion of the valve seat and two contact portions for the straight or parallel portion of the valve seat against the tapered portion or walls of the annular groove in the valve, thereby forming four distinct and what might be termed dull edged or close contact points. In the drawing we have illustrated both the inner and outer peripheries of the annular seat flange and the annular groove tapered, but we do not desire to be confined to this exact arrangement, owing to the fact that slight modifications might be made whereby the dull edged metal contact could be produced without the exact construction shown. It will be understood that by our peculiar arrangement any grit or dirt or other foreign substance will not interfere with the proper seating of the valve upon its seat. It is well understood that when a valve is brought down upon its seat where considerable surface is in contact as between the valve and the seat any foreign substance will have a tendency to prevent the proper seating of the valve. But by our peculiar arrangement any foreign substance such as mud or sand or flakes of lime will be sheared or scraped from the contact surface thereby allowing a clear contact connection at all times and under all circumstances as between the valve seat and the valve.

To the valve 6 is attached the nut 9 by means of suitable screw threads, which nut is for the purpose of properly connecting the valve stem 10, the nut 9 being so located and arranged that the valve stem 10 is free to rotate independent of the valve. The valve stem 10 is screw threaded and the screw threaded portion located through the screw threaded aperture 11 in the valve body cap 12, which valve body cap is of the ordinary construction. It will of course be understood that by rotating the valve stem 10 by means of the ordinary valve wheel 13 in one direction will open the valve, and rotating in the opposite direction will close or seat the valve. The valve cap 12 is provided with the ordinary packing cap 14, said parts being of the ordinary construction.

Having fully described our invention, what we claim as new and desire to secure by Letters Patent, is—

1. In a valve, a valve body and a valve seat web provided with an annular valve seat flange, said flange provided with a straight faced portion and a tapered portion, a valve provided with an annular groove having straight and tapered walls and the flange of the valve body adapted to be seated in the groove, said straight portion of the flange adapted to be seated against the tapered walls of the groove, and the angled portion of the flange of the valve body seated upon the straight walls of the groove, substantially as and for the purposes specified.

2. In a valve, the combination of a valve body, a valve seat therefor, consisting of an annular valve adapted to be actuated to and from the valve seat, said valve provided with an annular groove, the valve-seat flange adapted to enter the groove, said annular flange and groove provided with tapered and straight portions and the straight portions of the annular valve-seat flange adapted for engagement with the tapered portions of the groove, and the straight faced walls of the annular groove in the valve adapted for contact with the tapered faces of the annular seat flange, substantially as and for the purposes specified.

3. In a valve body, an annular valve-seat flange, said valve-seat flange provided with a tapered base, a valve provided with an annular groove, said groove tapered a portion of its depth, and the annular seat flange adapted to be entered in the groove and adapted for contact at its angle part, substantially as and for the purposes specified.

4. In a valve-seat of the class described, a valve body and an annular valve-seat flange formed integral therewith, said valve seat flange consisting of a tapered base portion and a straight portion and a valve adapted to move to and from the valve-seat flange and the valve provided with a groove its contour corresponding with the shape of the valve-seat flange and the wall of the groove adapted for contact at the angled portion of the flange, substantially as and for the purpose specified.

In testimony that we claim the above, we have hereunto subscribed our names in the presence of two witnesses.

DAVID LIPPY.
ABRAHAM NICODEMUS.

Witnesses:
A. A. DOUGLASS,
LUELLA ANDREWS.